United States Patent
Pearce

[19]

[11] Patent Number: 5,819,100

[45] Date of Patent: Oct. 6, 1998

[54] OPERATING SYSTEM INDEPENDENT METHOD AND SYSTEM FOR PRESERVING HARD DISK DRIVE LIFE SPAN IN POWER MANAGED COMPUTERS

[75] Inventor: John J. Pearce, Del Valle, Tex.

[73] Assignee: Dell USA, L.P., Round Rock, Tex.

[21] Appl. No.: 753,010

[22] Filed: Nov. 19, 1996

[51] Int. Cl.⁶ .......................... G11B 19/28; G11B 21/02; G06F 1/32
[52] U.S. Cl. ................. 395/750.05; 395/750.06; 395/750.03; 360/69
[58] Field of Search .................. 395/750.05, 750.06, 395/750.03, 750.08; 360/69; 364/707

[56] References Cited

U.S. PATENT DOCUMENTS

| | | | |
|---|---|---|---|
| 4,635,145 | 1/1987 | Horie et al. | 360/78.04 |
| 5,289,097 | 2/1994 | Erickson et al. | 318/561 |
| 5,481,733 | 1/1996 | Douglis et al. | 395/750.06 |
| 5,493,670 | 2/1996 | Douglis et al. | 395/750.06 |
| 5,517,649 | 5/1996 | McLean | 395/750.05 |
| 5,535,400 | 7/1996 | Belmont | 395/750.07 |
| 5,574,920 | 11/1996 | Parry | 395/750.08 |
| 5,666,538 | 9/1997 | DeNicola | 395/750.03 |
| 5,682,273 | 10/1997 | Hetzler | 360/75 |

*Primary Examiner*—Gopal C. Ray
*Attorney, Agent, or Firm*—Skjerven, Morrill, MacPherson, Franklin & Friel LLP; Ken J. Koestner

[57] ABSTRACT

A method and system of operating a power-managed computer system monitors the life cycle of a hard disk drive attached to the computer system and extends the life span of the hard disk drive by reducing the rate at which hard disk drive spin-up cycles are initiated when the hard drive reaches a predetermined stage it life cycle. Software routines which activate or spin-up the hard drive are extended in capability to read the hard drive serial number and record the serial number in a non-volatile memory in conjunction with an incrementing counter. The incrementing counter counts the number of times the hard drive has been activated from the time of installation of the hard drive. The count of spin-up occurrences is indicative of the operating age of the disk drive. A plurality of age levels are defined, for example medium, old and ancient levels so that, when the hard drive spin-up count reaches one of the defined levels, the power management system changes the operation of the hard drive power management.

20 Claims, 10 Drawing Sheets

OPERATING SYSTEM INDEPENDENT METHOD AND SYSTEM FOR PRESERVING HARD DISK DRIVE LIFE SPAN IN POWER MANAGED COMPUTERS

BACKGROUND OF THE INVENTION

1. Field of the Invention

The present invention relates in general to computer systems. More specifically, the invention relates to a system and method for monitoring the life span of hard disk drive in a personal computer system.

2. Description of the Related Art

Portable or laptop personal computers are powered by batteries with limited battery life so that power consumption reduction is highly advantageous. One technique for conserving power involves shutting down parts of the computer system which are not currently used. For example, if the display screen is not used for more than a predetermined period of time, the display screen is switched to a lower power "standby" state to conserve energy. Similarly, if the hard disk storage media of the computer has not been accessed for more than a predetermined period of time, the hard disk is switched to a lower power "standby" state to conserve energy. A head-disk assembly of a hard disk drive commonly rotates at a constant speed, for example 3600 revolutions per second, thereby consuming a substantial amount of energy. The standby state of a disk drive is attained by removing power from the rotating disk in a controlled manner, which is termed "spinning down" the disk.

Some portable computers operate as "Green PCs", which are designed to have a very low power consumption in an idle mode, include power management functions which completely or partially deactivate individual components typically beginning with the monitor, then the hard disk and other components. The memory and processor are generally the final components deactivated by a Green PC. Presently personal computers in which compliance to the Green PC standard is sought, or battery operated computers in which the battery life is extended, reduce energy consumption by selectively and occasionally operating the hard disk drive in a low power mode. Some researchers have determined that an optimal battery life is attained by spinning down a hard disk drive whenever the drive is inactive for fifteen seconds.

The hard disk drives which are capable of low power mode operations have a limited number of spin-up cycles due to the wearing of drive mechanical elements, particularly the bearings. A typical hard disk drive that operates in a low power mode fails after a number of spin-ups in a range from 10,000 to 50,000. The proposed fifteen second inactivity limit for spinning down the hard drive may be optimal for the battery but quickly exhausts the ability of the disk drive to spin up, leading to drive failure and warranty expense for a manufacturer. For example, a computer that is deactivated and activated once every five minutes during a 40-hour work week would exhaust a 25,000 spin up drive in slightly more than one year.

The problem of drive failure and a possible loss of data has been addressed in S.M.A.R.T. drive technology which analyzes a disk access error rate and determines when a drive failure is imminent on the basis of the error rate. Unfortunately, the error rate is only substantially increased by an amount which is sufficient for detection when the drive is very close to failure. Furthermore, the S.M.A.R.T. drive only analyzes and reports on two alternative conditions of the drive, a GOOD condition and a FAILING condition so that management of the hard drive to increase the life span is not performed.

What is needed is a system and method for operating a hard disk drive that allows the life span of the drive to be extended.

SUMMARY OF THE INVENTION

In accordance with the present invention, a method and system of operating a power-managed computer system monitors the life cycle of a hard disk drive attached to the computer system and extends the life span of the hard disk drive by reducing the rate at which hard disk drive spin-up cycles are initiated when the hard drive reaches a predetermined stage it life cycle.

Also in accordance with the present invention, software routines which activate or spin-up the hard drive are extended in capability to read the hard drive serial number and record the serial number in a non-volatile memory in conjunction with an incrementing counter. The incrementing counter counts the number of times the hard drive has been activated from the time of original installation of the hard drive. The count of spin-up occurrences is indicative of the operating age of the disk drive. A plurality of age levels are defined, for example medium, old and ancient levels so that, when the hard drive spin-up count reaches one of the defined levels, the power system management changes the operation of the power management system. For example, the power management system responds to a count at and below a medium age level by selecting the time the disk drive is idle before powering-down the drive as designated by the computer user or the operating system. For a count in the old range, the power management system increases the time the disk drive is idle before powering-down the drive. By increasing the average idle time before the drive is spundown, the system decreases the rate of occurrence of spin-up and spin-down cycles. For a count in the ancient range, the system simply overrides the power-down function so that no spin-up and spin-down cycles are performed, thereby avoiding the disk drive cycling and extending the life span of the drive, at the expense of a failure to conserve energy and battery life.

In accordance with a first embodiment of the present invention, a method of executing a utility program for preserving a life span of a hard disk drive includes the steps of operating a computer system having a processor and a hard disk drive under control of a selected one of a plurality of operating systems operable on the processor, accessing the hard disk drive and setting a power-down timer to a power-down time interval upon accessing of the hard disk. Responsive to a time-out of the power-down timer, the method includes the steps of deactivating and removing power from the hard disk drive. The method further includes the steps of determining the operating age of the hard disk drive, classifying the hard disk drive as a function of the operating age, and setting the power-down time interval as a function of the classification of the hard disk drive. The accessing, power-down timer setting, deactivating and removing, determining, classifying and power-down time interval setting steps are performed independent of the selected operating system.

In accordance with another embodiment of the present invention, a utility program preserves a hard disk drive life span. The utility program operates on a power-managed computer system having a processor, a memory storing the utility program, and a hard disk drive. The utility program includes a routine which deactivates the hard disk drive when the hard disk drive is idle for a designated power-down time interval, a routine which determines the operating age of the hard disk drive, a routine which classifies the hard disk drive as a function of the operating age, and a routine which sets the power-down time interval as a function of the classification of the hard disk drive.

Several advantages are gained by the disclosed method and system. One advantage is that the loss of valuable data is prevented by avoiding hard disk drive failure.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
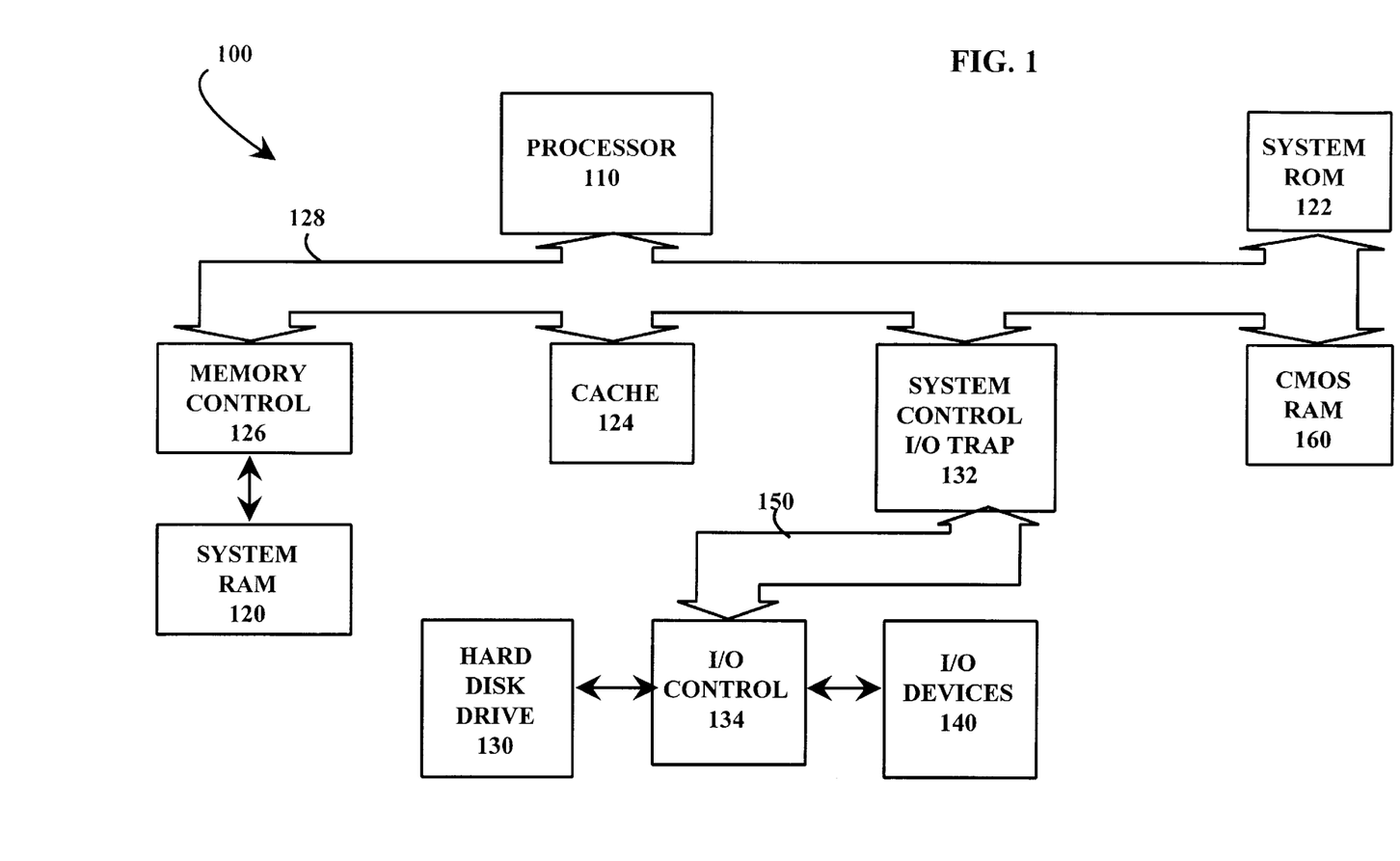
FIG. 1 is a block diagram which depicts computer system hardware upon which is implemented an operating system independent method for executing utility programs including a program for preserving the life span of a hard disk drive in a power managed computer.

Referring to FIG. 1, a computer system 100 is shown which runs a system for creating an operating system independent environment for executing utility programs including a program for preserving the life span of a hard disk drive in a power managed computer. The computer system 100, most appropriately a portable or laptop personal computer with respect to the power-managed aspects of the disclosed system, includes a processor 110, a system ROM 122, a cache 124, a memory controller 126, a CMOS clock nonvolatile RAM 160, and a system controller I/O trap 132. These system components communicate via a CPU bus 128 which includes data, address and control lines. The memory controller 126 is also connected to a system random access memory (RAM) 120. The system controller I/O trap 132 interfaces the CPU bus 128 to a local bus 150. The local bus 150 is connected to an I/O controller 134 which is connected to a hard disk drive 130 and various other input/output devices 140. The CMOS clock nonvolatile RAM 160, which is connected to the processor 110 via the CPU bus 128, is typically utilized to store information even when power to the computer system 100 is interrupted. Program instructions that make up the system for creating an operating system independent environment and utility programs including the program for preserving the life span of a hard disk drive in a power managed computer are stored in a storage device such as the hard disk drive 130 or the system ROM 122. The processor 110, for example an x86 processor such as a 486, Pentium or PentiumPro processor, executes the computing operations of the computer system 100.

The processor 110 is connected to the system RAM 120 via the memory controller 126 and the CPU bus 128. The system controller I/O trap 132 connects the CPU bus 128 to the local bus 150 and is generally characterized as part of a system controller such as a Pico Power Vesuvius or an Intel™ Mobile Triton chip set. System controller I/O trap 132 is programmed in a well-known manner to intercept a particular target address or address range, and, upon intercepting a target address, the system controller I/O trap 132 asserts an intercept signal indicating that processor 110 attempted to access the target address. The intercept signal is connected to an SMI ("system management interrupt") pin of the processor 110 to cause the processor 110 to enter a system management mode ("SMM").

The hard disk drive 130 may be a permanent drive or a removable hard drive. Similarly, the other input/output devices 140 may include one or more additional hard drives which may be permanent or removable drives. A removable drive configuration allows multiple users, each having an individual program and data base, to operate the computer system 100. The removable drive configuration is also useful for allowing a single user to effectively increase the hard drive capacity of the computer system 100. Various types of hard drives, all of which are well known in the computer system arts, may be utilized for the hard disk drive 130 and the other input/output devices 140, although small computer systems interface (SCSI) and integrated drive electronics (IDE) drives are exemplary of a useful type of drive. Each SCSI and advanced IDE drive encodes unique drive identification information including a unique manufacturer identification number and a drive serial number which are advantageous, but not essential, to the operation of the program for preserving the life span of a hard disk drive in a power managed computer. The unique identification information is useful in some configurations of the program for specifically identifying the hard drive, monitoring the activity of that drive, and thereby preserving the life span of the drive.

Figure 2:
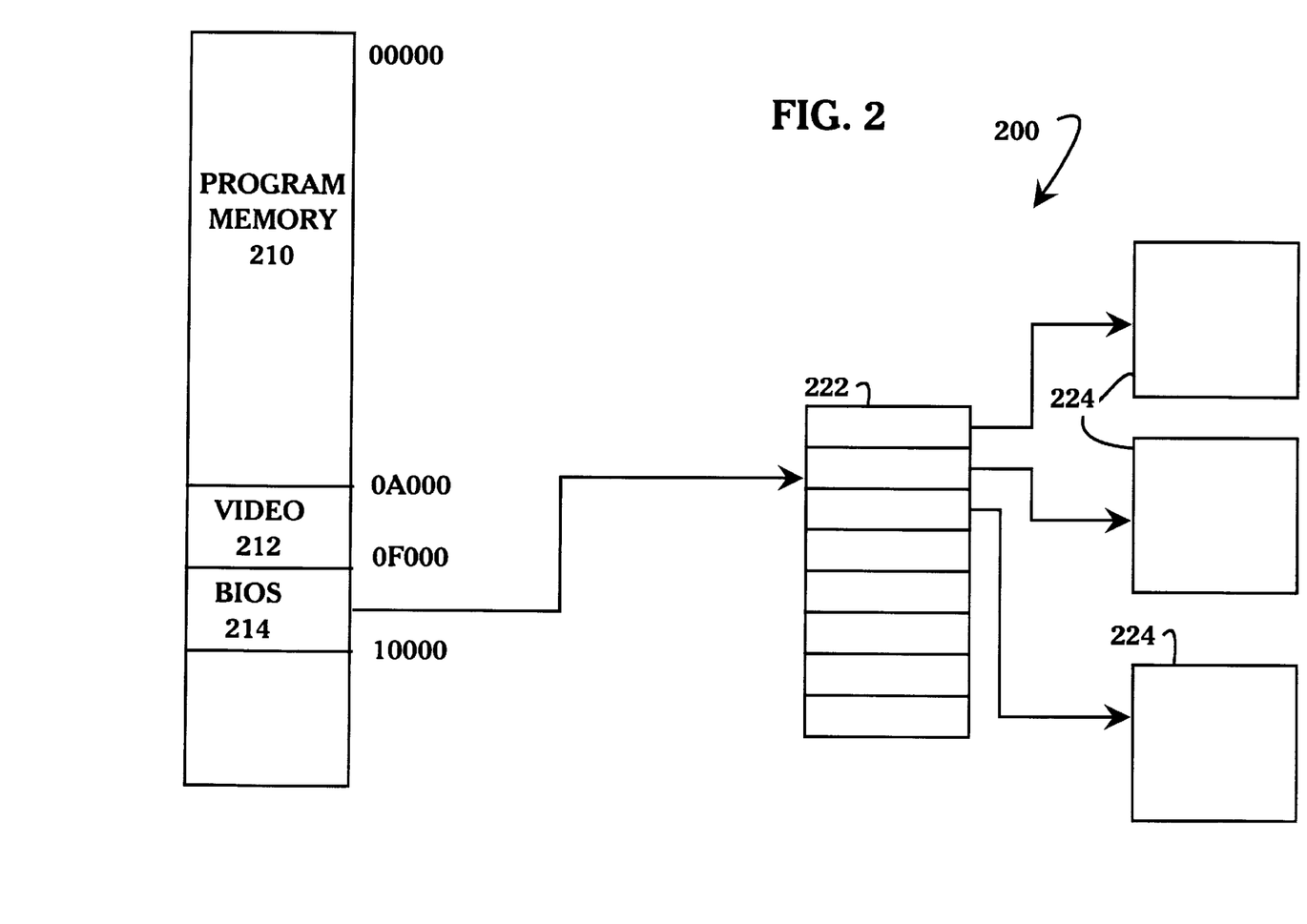
FIG. 2 is a pictorial illustration of a memory map of memory in the computer system shown in FIG. 1.

Referring to FIG. 2, a memory map 200 of a computer system shows a program memory 210 having a starting address of 0000H, a video memory 212 with a starting address of 0A00H and a BIOS memory 214 located at addresses 0F000H to 0FFFFH. A basic input output system (BIOS) is the part of an operating system that customizes the operating system to a specific computer. The BIOS forms the lowest-level interface to common devices such as a system clock, hard disk and display, for example.

In one mode of operation, the program code in the BIOS 214 operates by transferring operation identifiers and parameters to the CMOS memory 160 and performing an input/ output instruction that evokes a SMI# signal. The SMI# signal is a signal for activating a system management mode (SMM) of operating. The system management mode (SMM) software performs various control functions including power management functions under user control or system control. When a processor 110 recognizes a SMI# signal on an instruction boundary, the processor 110 waits for all store operations to complete. The processor 110 then saves the processor register state to a region in memory called a system management RAM (SMRAM) space and begins to execute a SMM handler routine. The SMI# interrupt has a greater priority than debug exceptions and external interrupts so that SMM processing preempts debug and external interrupt conditions. Subsequent SMI# and nonmaskable interrupt (NMI) requests are not acknowledged while the processor is operating in system management mode.

System management mode (SMM) processing is conventionally performed by a technique in which software routines write a defined pattern or code to a specific defined SMI input/output I/O location. A pattern is defined to be suitably complex that an incorrect and unsuitable pattern is not inadvertently set. Generally, the patterns encode a sufficient amount of operational information that this level of complexity is easily achieved. Advantageously, the pattern coding is sufficiently specific to the precise BIOS operations invoked that the security of a secured operating system is not compromised while useful functions are allowed to operate which would otherwise be prohibited by the operating system. The writing of this pattern to the SMI I/O location generates an SMI# signal, evoking a system management mode interrupt. In "secured" operating systems such as Windows NT™, direct write operations to the SMM I/O location are prohibited. This prohibition is enforced by the operating system which intercepts and emulates the I/O call. The operating system typically diverts the I/O instruction and information accompanying the instruction to an unknown location, fails to evoke the SMI# interrupt or SMM routine, and returns a failure code, perhaps informing that the addressed I/O location does not exist. Thus, if an attempt is made to read data from the SMM I/O location, a code is returned that apparently is an "empty bus notification" error code (OFFH).

Figure 3:
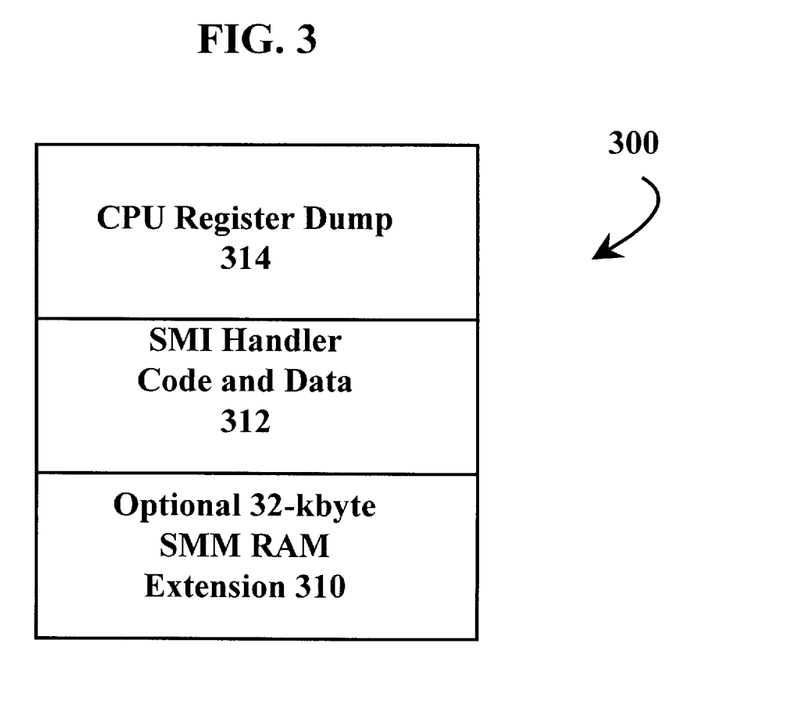
FIG. 3 is a pictorial illustration of a memory map showing a logical structure of a system management mode (SMM) RAM.

Referring to FIG. 3, a pictorial illustration of a memory map shows a logical structure of a system management mode (SMM) RAM. The processor 110 begins operating in SMM upon receipt of an active signal is received on the SMI# interrupt. The processor terminates SMM operation only when software executes an explicit resume from system management mode (RSM) instruction. For SMM, RAM chips are intended to be mapped into the address space of system RAM 120 between 30000h and 3FFFFH. Generally, SMM RAM 300 is mapped onto the system RAM 120 as shown in FIG. 3. The lower 32 kbytes 310 between addresses 30000h and 37FFFH are optional. Address 3000:8000h is the address entry point of an SMM handler which the processor 110 accesses upon receipt of every SMI# interrupt. The 32 kbytes 312 between 3000:8000h and 3000:FDFFH are available for the program code and data used by an SMI handler routine. These routines are well known in the art and include, for example, routines for saving the contents of memory to disk or for deactivating individual I/O devices 140. The processor 110 also accesses addresses outside the 64 kbyte SMM RAM so that data outside the SMM RAM 300 are accessible while operating in SMM.

A CPU register dump 314 is adjacent to the SMM program code and data memory 312 and includes 512 bytes. When the SMI# interrupt is activated and SMM begins operation, the processor 110 automatically, through operation of processor microcode rather than operating system software instructions, stores the CPU register dump 314 contents that are used for restoring the processor condition prior to the interrupt. Thus, following an RSM instruction, the processor 110 continues functioning under the conditions at the point of the SMI# occurrence. TABLE I shows the organization of the register dump in SMM RAM. Offsets are shown relative to the segment 3000h.

TABLE I

| Offset | Register | Offset | Register |
|--------|----------|--------|----------|
| FFFCH | CR0 | FFC4H | TR |
| FFF8H | CR3 | FFC0H | LDTR |
| FFF4H | EFlag | FFBCH | GS |
| FFF0H | EIP | FFB8H | FS |
| FFECH | EDI | FFB4H | DS |
| FFE8H | ESI | FFB0H | SS |
| FFE4H | EBP | FFACH | CS |
| FFE0H | ESP | FFA8H | ES |
| FFDCH | EBX | FF04H–FFA7H | reserved |
| FFD8H | EDX | FF02H | halt auto restart |
| FFD4H | ECX | FF00H | I/O trap restart |
| FFD0H | EAX | FFFCH | SMM identification |
| FFCCH | DR6 | FEF8H | register dump base |
| FFC8H | DR7 | FE00H–FEF7H | reserved |

In addition to the saved registers, the register dump also includes four control fields, specifically a halt auto reset (offset FF02H), a I/O trap restart (offset FF00H), an SMM identification (offset FEFCH), and a register dump base (offset FEF8H).

The SMM may be set up so that the SMI# interrupts an I/O instruction. In particular, the SMM may be set up so that an I/O instruction to a particular device, such as the hard disk drive 130, generates an SMI# interrupt. For example, by writing a value of FFFFH into the I/O trap restart address (offset FF00H), the processor 110 executes the interrupted I/O instruction after a return from the SMM interrupt service routine takes place through an RSM instruction. In this manner, one technique for I/O port trapping is achieved.

The entry SMM identification (offset FEFCH) indicates the revision level and the functional capabilities of the implemented SMM.

Figure 4:
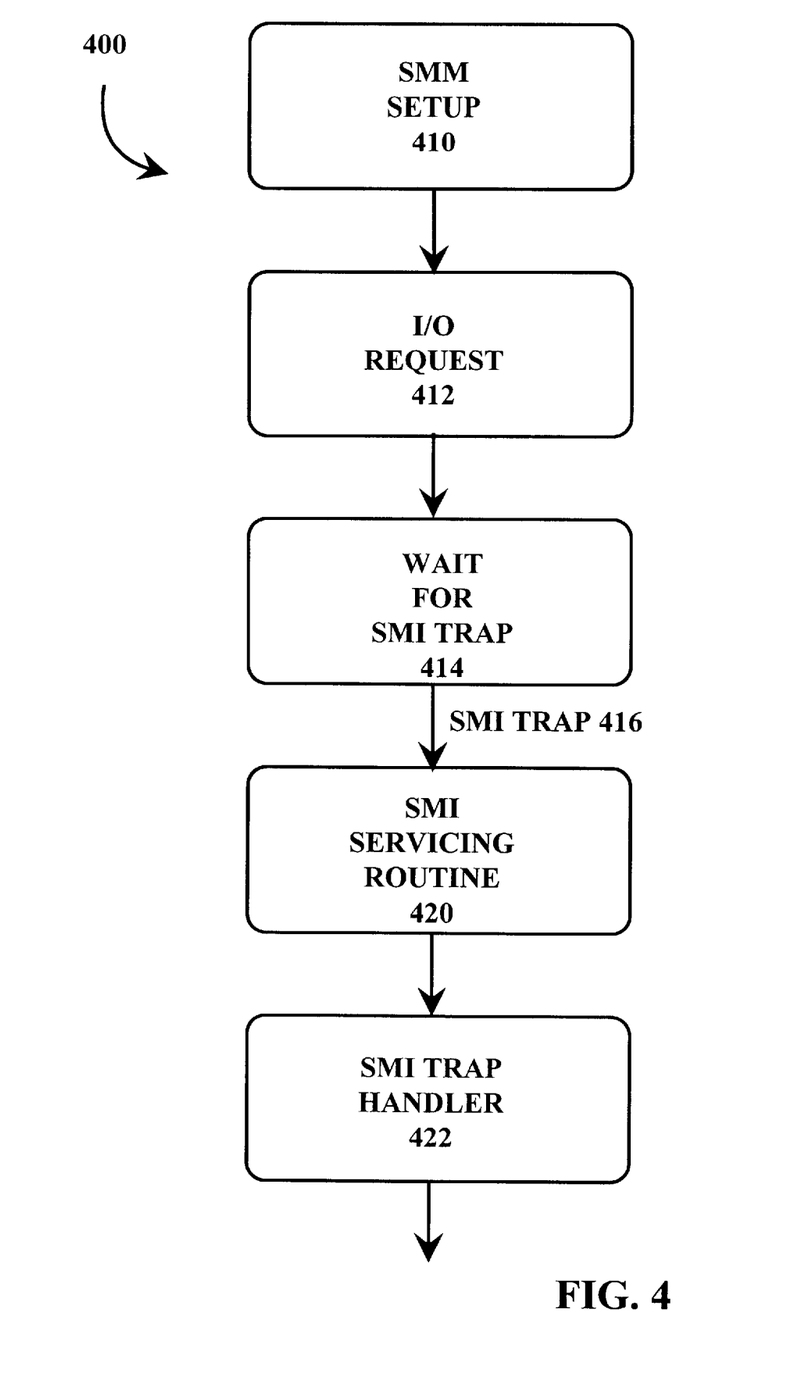
FIG. 4 is a flow chart which depicts a system management mode routine controlling I/O operations in an operating system independent environment.

Referring to FIG. 4, a flow chart depicts a system management mode (SMM) I/O disk control routine 400 which is activated by a system management interrupt (SMI#) and includes trapping of I/O accesses such as hard disk I/O accesses. In a SMM setup step 410, entry into the SNM is controlled so that the interrupt (SMI) is generated in response to an I/O request directed to a particular range of I/O addresses. An I/O calling program that controls disk I/O operations determines all of the parameters to be applied to a hardware disk controller to control the I/O functions. One of the parameters that is initialized is an SMM timer which determines the elapsed time from the most recent hard disk access. For example, the timer is set to allow the SMM to spin down the disk and thereby conserve energy and battery life.

After all of the parameters are determined, in I/O request step 412 the I/O calling program issues a disk I/O command by writing the command to the hardware disk controller. After the disk I/O command is written, in wait step 414 the I/O calling program operation is suspended awaiting an SMI trap event. When the SMI trap event 416 occurs, the processor saves the current register state to system management RAM (SMRAM) space and begins to execute the SMM handler. A SMI servicing routine 420 reads from the hardware disk controller all of the parameters resulting from disk I/O operations. The SMI trap handler 422 directs a drive I/O request to the proper location of the hard disk drive 130, starts the drive and then exits out of the system management mode with the RSM (return from system management mode) instruction, allowing the virtual I/O operations to continue.

Figure 5:
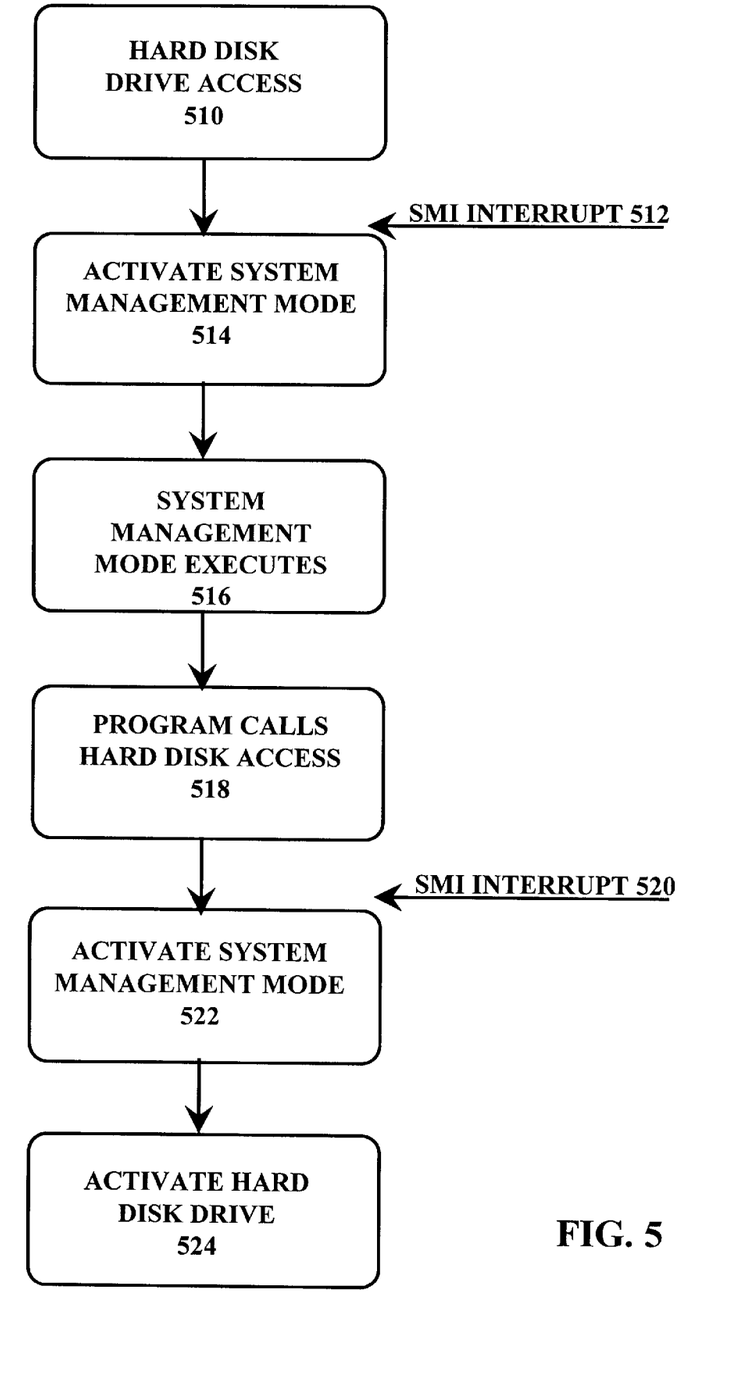
FIG. 5 is a flow chart showing actions performed by a SMM routine for controlling hard disk drive I/O operations in response to an illustrative sequence of events.

Referring to FIG. 5, a flow chart shows actions performed by an SMM routine controlling hard disk drive I/O operations in response to an illustrative sequence of events. In event 510, the hard disk drive is accessed by the SMM subsequent to I/O trapping of an instruction in program code such as, but not limited to, various read, write, write and verify, and seek instructions targeting data blocks, multiple blocks, blocks with error check and error correction (ECC) bytes and the like. The hard drive access is executed under control of the SMM and sets the parameters applied to the disk control operation. The SMM checks a hard disk power down enable flag (not shown) and if powering down of the hard disk is enabled, the timer of the elapsed interval from the most recent hard disk access is initialized to a predetermined value. For example the timer may be initialized to time fifteen seconds and invoke an SMI# interrupt at the conclusion of the fifteen second interval. In this manner, the power management routines in the SMM are ignored as a call to deactivate the drive essentially reports that the drive is deactivated but simply fails to actually deactivate the drive.

In this example, the timer elapses by virtue of a time-out of the fifteen second interval, invoking the SMI# interrupt event 512. The SMI# interrupt activates the SMM in event 514. The SMM routine executes in event 516 in which the SMM deactivates the hard drive and enables an SMI# interrupt for performing I/O trapping of program code requesting a hard disk access. The SMM performs an instruction such as an SCSI start/stop instruction (SCSI command code 1BH) which instructs a designated disk drive to move heads out of transport position and switch off a spindle motor (not shown) of the hard disk drive. The disk drive spins down in response to the start/stop command.

In event 518, a program call requesting a hard disk access occurs after a variable time interval and the hard disk I/O request is trapped using SMM I/O trapping and an SMI# interrupt occurs as event 520. In response to the SMI# I/O trapping interrupt 520, the SMM is activated in event 522. The SMM activates the hard disk drive in event 524 by executing, for example, a program 600 for preserving the life span of a hard disk drive.

Figure 6:
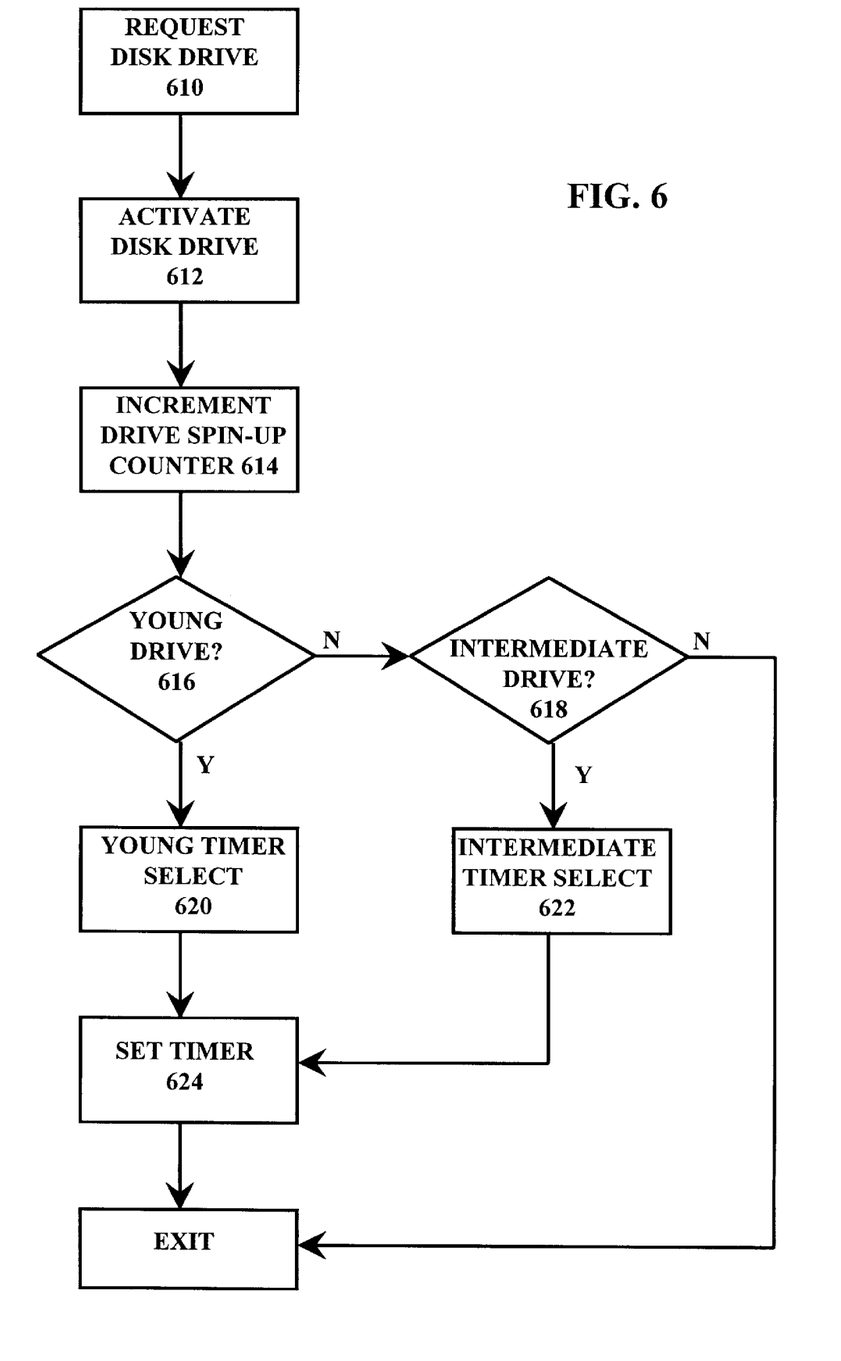
FIG. 6 is a flow chart which illustrates steps of a program for preserving the life span of a hard disk drive.

Referring to FIG. 6, a flow chart illustrates steps of the program 600 for preserving the life span of a hard disk drive which receives a request to activate the disk drive in step 610. In activate hard drive step 612, the SMM activates the hard drive using the start/stop instruction (SCSI command code 1BH) which sends a code to the hard drive to instruct the designated disk drive to move heads into the transport position and switch on a spindle motor (not shown) of the hard disk drive, thereby causing the disk drive to spin up. In step 614, the program 600 for preserving the life span of a hard disk drive then increments a counter which accumulates the number of times the drive has been activated. The counter is located in different storages or memories in different embodiments or in different alternative pathways of the program 600. Logical blocks 616 and 618 implement a case statement classifying the hard drive into different classes according to the number of times the drive has been activated or spun up. Logical block 616 compares the accumulated count to a first predetermined number of activations which is indicative of a "young" drive. If the hard drive is older than the young age, logical block 618 compares the accumulated count to a first predetermined number of activations which is indicative of an "intermediate age" drive.

For a young hard drive, a young timer select block 620 sets a timer value that is selected by a user, the operating system or a combination of the user and operating system. The timer value is selected with a primary purpose of conserving energy and increasing the battery lifetime before recharging is required. For example, a fifteen second interval may be instituted as a time limit for an idle drive to be deactivated.

For an intermediate age drive, an intermediate timer select block 622 sets a timer value that is dependent upon the age of the hard drive. Typically a range of timer values are hard-coded into the software, selected by a user, selected by the operating system or selected by a combination of the user and operating system. The timer value is set with a primary purpose of conserving the life span of the hard drive and to prevent loss of data due to a hard drive failure. A particular timer value in the range of timer values is selected on the basis of the count of hard drive activations. For example, the interval may range from a thirty second interval to an interval on the order of hours in accordance with an advancing age of a hard drive. In some embodiments, information in addition to the count of hard drive activations may be taken into account in determining the spin down time interval. For example, a measure based on the number of hard drive I/O errors may also be considered.

Upon completion of either the young timer select block 620 or the intermediate timer select block 622, a set timer step 624 sets an SMM timer for timing out upon exceeding a preset elapsed interval from the most recent hard disk access.

For a hard drive that is older than the intermediate age, old hard drive selection block 626 sets the hard disk power down enable flag which indicates that the hard drive is not to be deactivated through operation of the program 600 for preserving the life span of a hard disk drive.

Figure 7:
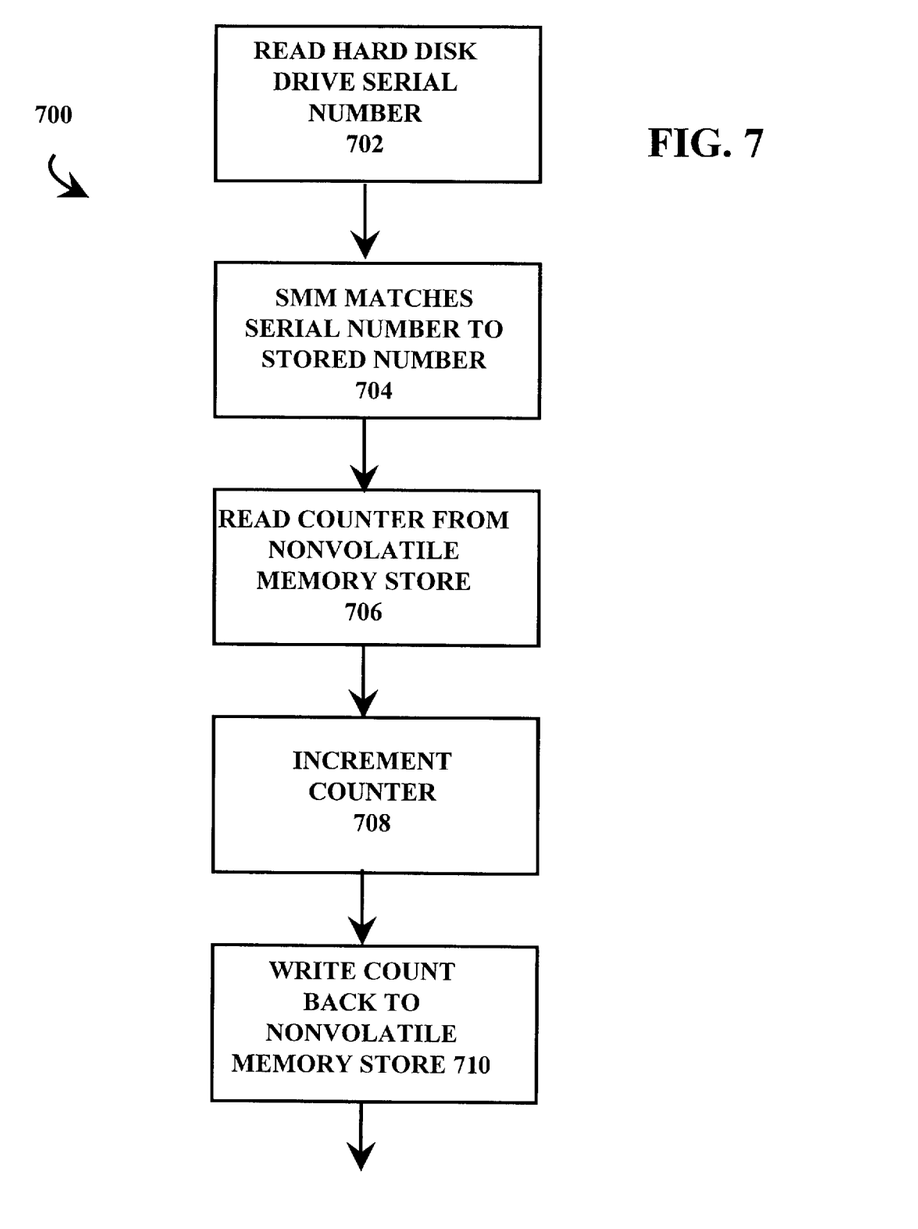
FIG. 7 is a flow chart which illustrates a routine for incrementing a counter stored in a nonvolatile memory in the computer system, a step in the program for preserving the life span of a hard disk drive.

Step 614 of the program 600 for preserving the life span of a hard disk drive accumulates a count of the number of times the drive has been activated. The counter is located in different storages or memories in different embodiments or in different alternative pathways of the program 600. One exemplary storage location is a nonvolatile memory in the computer system 100, such as the CMOS RAM 160. A routine 700 for incrementing the counter stored in a nonvolatile memory in the computer system 100 is depicted in FIG. 7. In step 702, the increment counter routine 700 reads the hard disk drive serial number from the hard disk drive 130 using a command such as the SCSI inquiry command (command code 12h). The inquiry command transfers parameters of a target I/O device to the calling routine in a data-in phase. The inquiry parameters include a five byte header and additional information such as a manufacturer code, a model number, a revision or version number and a serial number. The target I/O device aborts the data-in phase when all parameters are transferred. The additional information is defined according to the type of device and the manufacturer specifications.

In step 704, the SMM finds a matching serial number stored in the nonvolatile memory so that a correct counter in the nonvolatile memory is incremented. If the hard drive serial number does not match a serial number stored in the nonvolatile memory, a new storage cell in the nonvolatile memory is allocated to hold the new hard drive serial number and associated counter and the counter is set to a count of one. In read counter step 706, SMM reads the counter identified by the serial number read from the hard disk. In increment step 708, the counter is incremented by one.

In write count step 710, the SMM writes the incremented count back to the nonvolatile memory storage.

One disadvantage of the routine 700 for incrementing the counter stored in a nonvolatile memory in the computer system 100 is that a removable disk operating on a different computer system will not have the power cycle count incremented so that the age data will not be accurate.

Figure 8:
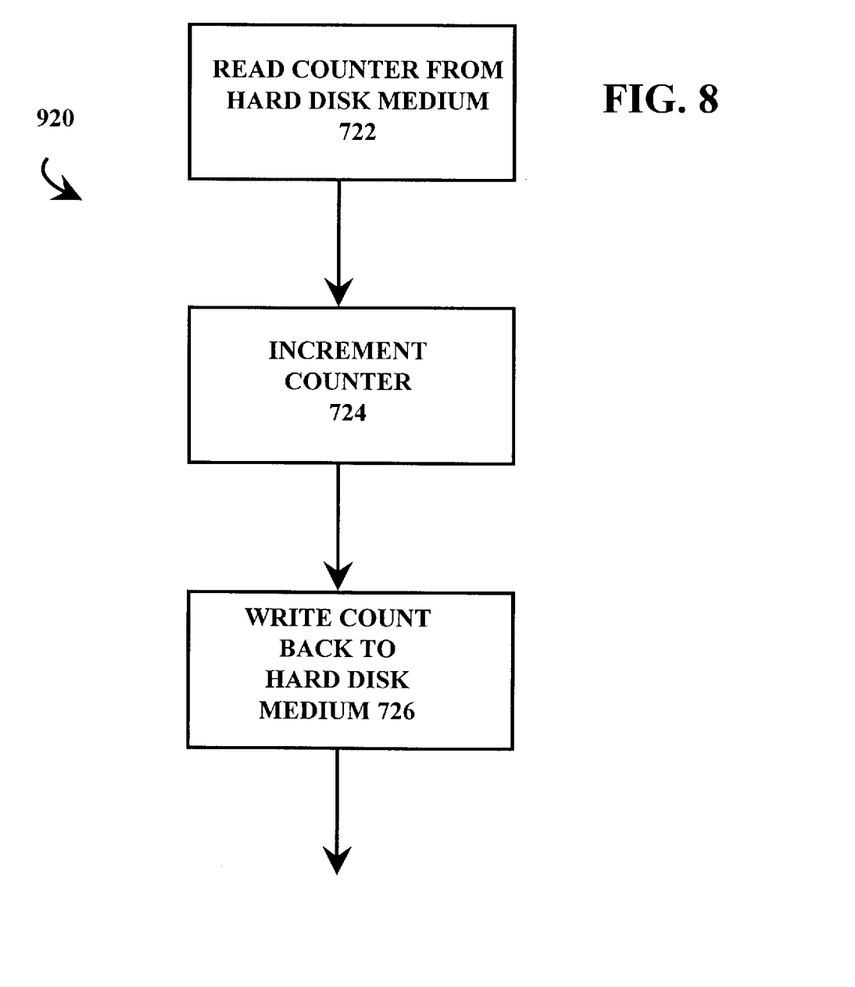
FIG. 8 is a flow chart which illustrates a routine for incrementing a counter stored on the hard drive medium, a step in the program for preserving the life span of a hard disk drive.

A second exemplary storage location, which avoids this disadvantage, is a storage location on the medium of the hard disk drive 130. For example, the count value may be stored within a utility area, such as a Suspend-to-Disk partition of the hard disk drive medium. The Suspend-to-Disk partition is used to store program code and data from the processor memory to the hard disk drive 130, typically during a power interruption of the processor 110. The operation of the processor 110 with respect to the Suspend-to-Disk partition is discussed in more detail in U.S. Patent application (Attorney Docket Number M-3442 US) entitled "AN OPERATING SYSTEM INDEPENDENT SYSTEM FOR RUNNING UTILITY PROGRAMS IN A DEFINED ENVIRONMENT", invented by J. Pearce et al, which is hereby incorporated by reference into the present application in its entirety. A routine 720 for incrementing the counter stored on the hard drive medium is shown in FIG. 8. In step 722, the increment counter routine 720 reads a counter location storage on the hard disk medium using a command such as the SCSI block read command (command code 08h). The read command instructs the target I/O device to read one or more blocks from the drive and to transfer the data in a data-in phase to the calling routine. In increment step 724, the SMM increments the counter by one. In write count step 726, the SMM writes the incremented count back to the counter location storage on the hard disk medium using a command such as the SCSI block write command (command code 0AH). The write command instructs the target I/O device to receive one or more blocks from the calling routine in a data-out phase and writing the blocks to the medium.

An advantage of the routine 720 for incrementing the counter stored on the hard drive medium is that the counter is incremented on a removable disk drive that operates in any computer system which implements the program 600 for preserving the life span of a hard disk drive.

Figure 9:
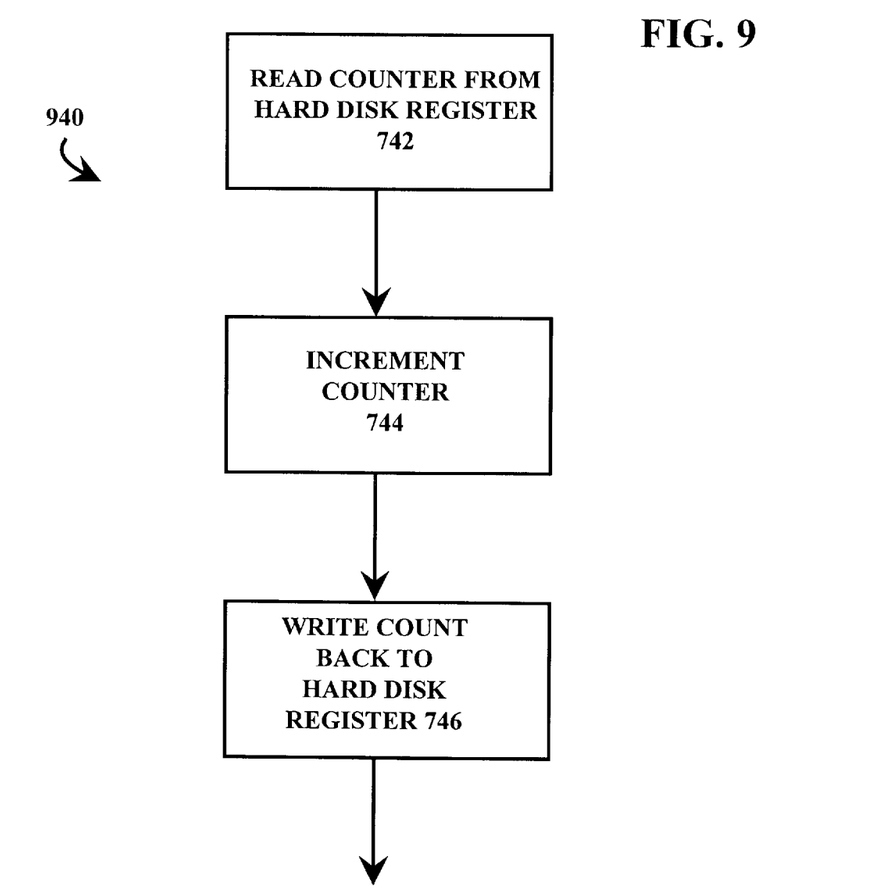
FIG. 9 is a flow chart which illustrates a routine for incrementing a counter register on the hard disk, a step in the program for preserving the life span of a hard disk drive.

A third exemplary storage location is a storage within the hard disk drive 130. In this example, the hard disk drive includes a storage such as a register for receiving special information. A routine 740 for incrementing the counter stored on the hard drive medium is shown in FIG. 9. In step 742, the increment counter routine 740 reads a counter register on the hard disk using a special read from register command. In increment step 744, the SNM increments the counter by one. In write count step 746, the SMM writes the incremented count back to the hard disk register using a special write to register command.

Figure 10:
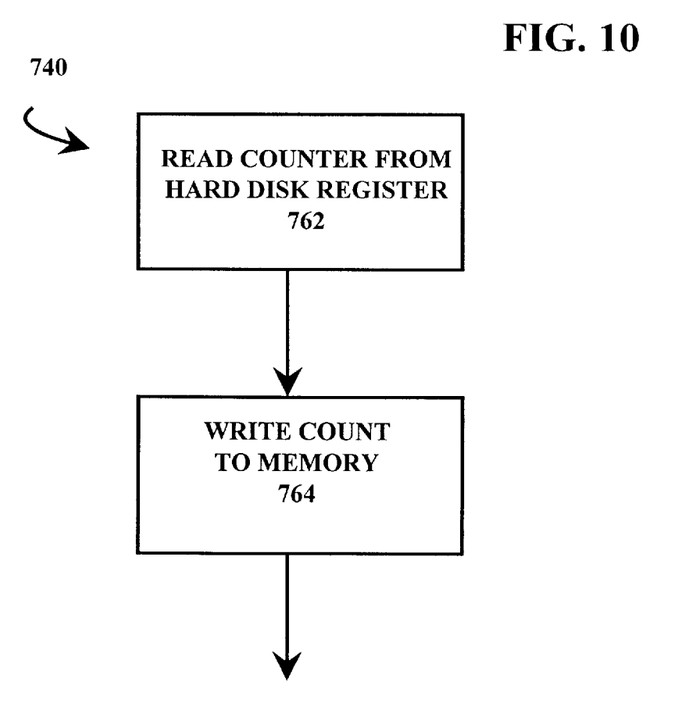
FIG. 10 is a flow chart which illustrates a routine for reading an automatically incrementing counter on the hard disk, a step in the program for preserving the life span of a hard disk drive.

Alternatively, the hard disk drive may include a counter and microcode that controls the counter to automatically increment whenever the power to the hard disk drive is activated. This hard drive is initiated to a zero count at the time of manufacture. A routine 760 for reading the counter is substituted for the increment counter step 614 of the program 600 for preserving the life span of a hard disk drive. The routine 760 for reading an automatically incrementing counter register is shown in FIG. 10. In step 762, the read counter routine 760 reads the counter storage from the hard disk using a special read from register command. In store count step 764, the SMM stores the count in local storage for subsequent use.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize the system management mode (SMM) and BIOS to implement the power management functionality and the utility program for preserving the life span of a disk drive. In other embodiments, the system for preserving the life of a hard disk drive is implemented without invoking SMM. Also in other embodiments, the SMM may operate without the BIOS to implement these functions. Similarly, the BIOS alone may include program code attaining this functionality. In still other embodiments, other operating system or application routines may be used as a framework for performing these functions.

In other embodiments, the number of hard drive age classifications, shown in the illustrative example to be three, may be increased or reduced and different actions may be taken in response to a particular classification. For example, some hard drive age classes may evoke a display on the screen indicative of a particular drive condition.

What is claimed is:

1. A method of executing a utility program for preserving a life span of a hard disk drive operating on a power-managed computer system having a processor, a hard disk drive and a power-managing operating system which deactivates the hard disk drive when the hard disk drive is idle for a designated power-down time interval, the method comprising the steps of:

determining the operating age of the hard disk drive;

classifying the hard disk drive as a function of the operating age; and setting the power-down time interval as a function of the classification of the hard disk drive so that a hard disk drive classified as having an older operating age is powered-down less frequently than a hard disk drive classified as having a younger operating age to preserve the life span of the hard disk drive.

2. A method according to claim 1 wherein the step of determining the operating age of the hard disk drive includes the step of incrementing a hard disk drive power-up count each time the hard disk drive is activated.

3. A method according to claim 1 wherein the step of classifying the hard disk drive as a function of the operating age includes the step of classifying the hard disk drive according to the number of times the hard disk drive is activated.

4. A method according to claim 1 wherein:

the step of classifying the hard disk drive includes the steps of:

classifying the hard disk drive age as a first age when the number of power-up counts is less than a designated first count limit;

classifying the hard disk drive age as a second age when the number of power-up intervals is greater than a second count limit; and classifying the hard disk drive age as a third age when the number of power-up intervals is between the designated first count limit and the designated second count limit.

5. A method according to claim 4 wherein:

the step of setting the power-down time interval includes the steps of:

setting the power-down time interval to a user-defined interval when the hard disk drive is classified in the first age;

setting the power-down time interval to an interval determined as a function of the drive age when the hard disk drive is classified in the third age; and setting the power-down time interval to not power-down when the hard disk drive is classified in the second age.

6. A method according to claim 1 further comprising the steps of:

performing the determining, classifying and setting steps for each of a plurality of power-managing operating systems so that the determining, classifying and setting steps are performed independently of the operating system activated at any time.

7. A method according to claim 1 further comprising the steps of:

operating the processor under control of a selected one of a plurality of power-managing operating systems; controlling hard disk input and output operations independently of the selected operating system by invoking a System Management Mode (SMM) to intercept hard disk input/output accesses using a System Management Mode Interrupt (SMI) including the steps of:

setting up parameters for performing disk accesses in a disk controller;

issuing a hard disk I/O command from a calling routine;

waiting for an SMI thereby trapping a disk access with an SMI; and responsive to the SMI, servicing the hard disk according to the issued hard disk I/O command.

8. A method according to claim 7 wherein the hard disk input and output operation controlling step further comprising the steps of in association with the hard disk servicing step, setting a power-down timer according to the power-down time interval, a time-out of the power-down timer invoking an SMI; and responsive to the power-down timer time-out SMI, invoking the SMM to disable the hard drive.

9. A method of executing a utility program for preserving a life span of a hard disk drive comprising the steps of:

operating a computer system having a processor and a hard disk drive under control of a selected one of a plurality of operating systems operable on the processor;

accessing the hard disk drive;

setting a power-down timer to a power-down time interval upon accessing of the hard disk;

responsive to a time-out of the power-down timer, deactivating and removing power from the hard disk drive;

determining the operating age of the hard disk drive;

classifying the hard disk drive as a function of the operating age; and setting the power-down time interval as a function of the classification of the hard disk drive so that a hard disk drive classified as having an older operating age is powered-down less frequently than a hard disk drive classified as having a younger operating age to preserve the life span of the hard disk drive;

the accessing, power-down timer setting, deactivating and removing, determining, classifying and power-down time interval setting steps being performed independent of the selected operating system.

10. A method according to claim 9 wherein the step of determining the operating age of the hard disk drive includes the step of incrementing a hard disk drive power-up count each time the hard disk drive is activated.

11. A method according to claim 9 wherein the step of classifying the hard disk drive as a function of the operating age includes the step of classifying the hard disk drive according to the number of times the hard disk drive is activated.

12. A method according to claim 9 wherein:

the step of classifying the hard disk drive includes the steps of:

classifying the hard disk drive age as a first age when the number of power-up counts is less than a designated first count limit;

classifying the hard disk drive age as a second age when the number of power-up intervals is greater than a second count limit; and classifying the hard disk drive age as a third age when the number of power-up intervals is between the designated first count limit and the designated second count limit.

13. A method according to claim 12 wherein:

the step of setting the power-down time interval includes the steps of:

setting the power-down time interval to a user-defined interval when the hard disk drive is classified in the first age;

setting the power-down time interval to an interval determined as a function of the drive age when the hard disk drive is classified in the third age; and setting the power-down time interval to not power-down when the hard disk drive is classified in the second age.

14. A utility program for preserving a hard disk drive life span operating on a power-managed computer system having a processor, a memory storing the utility program, a hard disk drive, and a power-managing operating system which deactivates the hard disk drive when the hard disk drive is idle for a designated power-down time interval, the utility program comprising:

a routine which determines the operating age of the hard disk drive;

a routine which classifies the hard disk drive as a function of the operating age; and a routine which sets the power-down time interval as a function of the classification of the hard disk drive so that a hard disk drive classified as having an older operating age is powered-down less frequently than a hard disk drive classified as having a younger operating age to preserve the life span of the hard disk drive.

15. A utility program according to claim 14 wherein the hard disk drive operating age determining routine includes a routine which increments a hard disk drive power-up count each time the hard disk drive is activated.

16. A utility program according to claim 14 wherein hard disk drive classifying routine includes a routine which classifies the hard disk drive according to the number of times the hard disk drive is activated.

17. A computer system comprising:

a power-managed computer system having a processor, a memory coupled to the processor, and a hard disk drive;

a power-managing operating system which deactivates the hard disk drive when the hard disk drive is idle for a designated power-down time interval; and a utility program for executing on the processor and preserving a hard disk drive life span, the utility program including:
   a routine which determines the operating age of the hard disk drive;
   a routine which classifies the hard disk drive as a function of the operating age; and
   a routine which sets the power-down time interval as a function of the classification of the hard disk drive so that a hard disk drive classified as having an older operating age is powered-down less frequently than a hard disk drive classified as having a younger operating age to preserve the life span of the hard disk drive.

18. A method of providing a computer system comprising the steps of:

providing a power-managed computer system having a processor, a memory coupled to the processor, and a hard disk drive;

providing a power-managing operating system which deactivates the hard disk drive when the hard disk drive is idle for a designated power-down time interval; and providing a utility program for preserving a hard disk drive life span, the utility program including:
   a routine which executes on the processor and determines the operating age of the hard disk drive;
   a routine which executes on the processor and classifies the hard disk drive as a function of the operating age; and
   a routine which executes on the processor and sets the power-down time interval as a function of the classification of the hard disk drive so that a hard disk drive classified as having an older operating age is powered-down less frequently than a hard disk drive classified as having a younger operating age to preserve the life span of the hard disk drive.

19. A utility program for preserving a hard disk drive life span operating on a power-managed computer system having a processor, a memory storing the utility program, and a hard disk drive, the utility program comprising:

a routine which deactivates the hard disk drive when the hard disk drive is idle for a designated power-down time interval;

a routine which determines the operating age of the hard disk drive;

a routine which classifies the hard disk drive as a function of the operating age; and a routine which sets the power-down time interval as a function of the classification of the hard disk drive so that a hard disk drive classified as having an older operating age is powered-down less frequently than a hard disk drive classified as having a younger operating age to preserve the life span of the hard disk drive.

20. A computer program product for a computer system having a processor, a memory coupled to the processor, and a hard disk drive coupled to the processor, the computer system utilizing a power-managing operating system which deactivates the hard disk drive when the hard disk drive is idle for a designated power-down time interval, the computer program product comprising:

a computer usable medium having computable readable code embodied therein including a utility program for executing on the processor and preserving a hard disk drive life span, the utility program including:
   a routine which determines the operating age of the hard disk drive;
   a routine which classifies the hard disk drive as a function of the operating age; and
   a routine which sets the power-down time interval as a function of the classification of the hard disk drive so that a hard disk drive classified as having an older operating age is powered-down less frequently than a hard disk drive classified as having a younger operating age to preserve the life span of the hard disk drive.

* * * * *

UNITED STATES PATENT AND TRADEMARK OFFICE
CERTIFICATE OF CORRECTION

PATENT NO. : 5,819,100

DATED : 10/6/98

INVENTOR(S) : Pearce

It is certified that error appears in the above-identified patent and that said Letters Patent is hereby corrected as shown below:

Column 9, line 29, delete "(Attorney Docket No. M-3442US)" and replace with --Serial No. 08/592,504 filed January 26, 1996--

Signed and Sealed this

Ninth Day of February, 1999

Attest:

Attesting Officer

*Acting Commissioner of Patents and Trademarks*